United States Patent
Hardman et al.

(10) Patent No.: US 7,124,751 B2
(45) Date of Patent: Oct. 24, 2006

(54) ELECTRONIC EXHAUST GAS RECIRCULATION VALVE CONTROL

(75) Inventors: Ken Hardman, Clarkston, MI (US); Michael A Bonne, Leonard, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 11/084,488

(22) Filed: Mar. 18, 2005

(65) Prior Publication Data

US 2006/0207580 A1    Sep. 21, 2006

(51) Int. Cl.
*F02M 25/07* (2006.01)
*G06G 19/00* (2006.01)
(52) U.S. Cl. .................. 123/568.21; 701/108
(58) Field of Classification Search ......... 123/568.11, 123/568.16, 568.21, 568.26, 568.27; 701/103, 701/108, 115; 251/129.15, 129.16; 361/152, 361/153, 160
See application file for complete search history.

(56) References Cited

U.S. PATENT DOCUMENTS

| | | | | |
|---|---|---|---|---|
| 4,142,493 A | * | 3/1979 | Schira et al. ........... | 123/568.21 |
| 4,164,206 A | * | 8/1979 | Toelle .................... | 701/108 |
| 4,242,728 A | * | 12/1980 | Hartford ................ | 701/108 |
| 4,432,331 A | * | 2/1984 | Yasuhara .............. | 123/568.16 |
| 4,548,185 A | * | 10/1985 | Pozniak ................ | 701/108 |
| 5,921,224 A | * | 7/1999 | Sinnamon ............ | 123/568.21 |
| 6,095,127 A | * | 8/2000 | Kolmanovsky et al. ....... | 123/568.21 |
| 6,112,729 A | | 9/2000 | Barnes et al. ........ | 123/568.21 |
| 6,378,515 B1 | * | 4/2002 | Geyer .................. | 701/108 |
| 6,401,700 B1 | * | 6/2002 | Balekai et al. ........ | 701/108 |
| 6,467,469 B1 | | 10/2002 | Yang et al. | |
| 6,708,676 B1 | | 3/2004 | Akao et al. ........... | 123/568.16 |
| 6,715,476 B1 | * | 4/2004 | Gopp et al. ........... | 701/108 |
| 6,899,093 B1 | * | 5/2005 | Center ................... | 123/568.16 |

* cited by examiner

*Primary Examiner*—Willis R. Wolfe, Jr.
(74) *Attorney, Agent, or Firm*—Ralph E. Smith

(57) ABSTRACT

An EGR valve position control method controls a position of an EGR valve according to a pressure change across the valve and a desired EGR valve position. The method calculates a desired EGR valve position and generates one or more duty cycle control terms based on a difference between the desired EGR valve position and an actual EGR valve position. Additionally, the method provides feedforward control based on the pressure change and the desired EGR valve position in order to generate feedforward duty cycle control terms. The method controls the position of the EGR valve based on the duty cycle control terms.

12 Claims, 3 Drawing Sheets

ELECTRONIC EXHAUST GAS RECIRCULATION VALVE CONTROL

FIELD OF THE INVENTION

The present invention relates to exhaust gas recirculation valves, and more particularly to electronically controlling a position of an exhaust gas recirculation valve based on a desired EGR valve position and a pressure across the valve.

BACKGROUND OF THE INVENTION

Exhaust gas recirculation (EGR) is used to reduce emissions and increase fuel economy in internal combustion engines. Exhaust gas is forced from the engine cylinders into the exhaust manifold after combustion. The exhaust gas includes non-burnable gas and other emissions that are otherwise released into the environment. Conventionally, EGR is used while the engine is running to reduce emissions and increase fuel economy.

The exhaust gas is mixed with intake air before entering the engine cylinders. Because the exhaust gas is non-burnable and takes up volume, the throttle has to open further in order to maintain a desired power level. A larger throttle opening reduces pumping losses and increases engine fuel efficiency.

SUMMARY OF THE INVENTION

A position control system for an EGR valve that includes a solenoid actuator comprises a desired EGR valve position module that calculates a desired EGR valve position. An actual EGR valve position module communicates with the EGR valve and calculates an actual EGR valve position. An EGR valve pressure change module determines a pressure change across the EGR valve. A first lookup table communicates with the EGR valve position module and determines a first duty cycle control term indicative of the desired EGR valve position. A second lookup table communicates with the EGR valve pressure change module and determines a second duty cycle control term indicative of the pressure change. A control module communicates with the desired EGR valve position module, the actual EGR valve position module, and the first and second lookup tables. The control module generates an error signal based on the desired EGR valve position and the actual EGR valve position, calculates at least one third duty cycle control term based on the error signal, and controls a duty cycle of the solenoid actuator according to the first, second, and third duty cycle control terms.

In another aspect of the invention, a position control method for an EGR valve comprises calculating a desired EGR valve position. An EGR valve position error is calculated according to the desired EGR valve position and an actual EGR valve position. At least one duty cycle control term is calculated based on the EGR valve position error. At least one duty cycle feedforward term is calculated. An output duty cycle is calculated based on the at least one duty cycle feedforward term and the at least one duty cycle control term. A duty cycle of the solenoid actuator is controlled based on the output duty cycle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
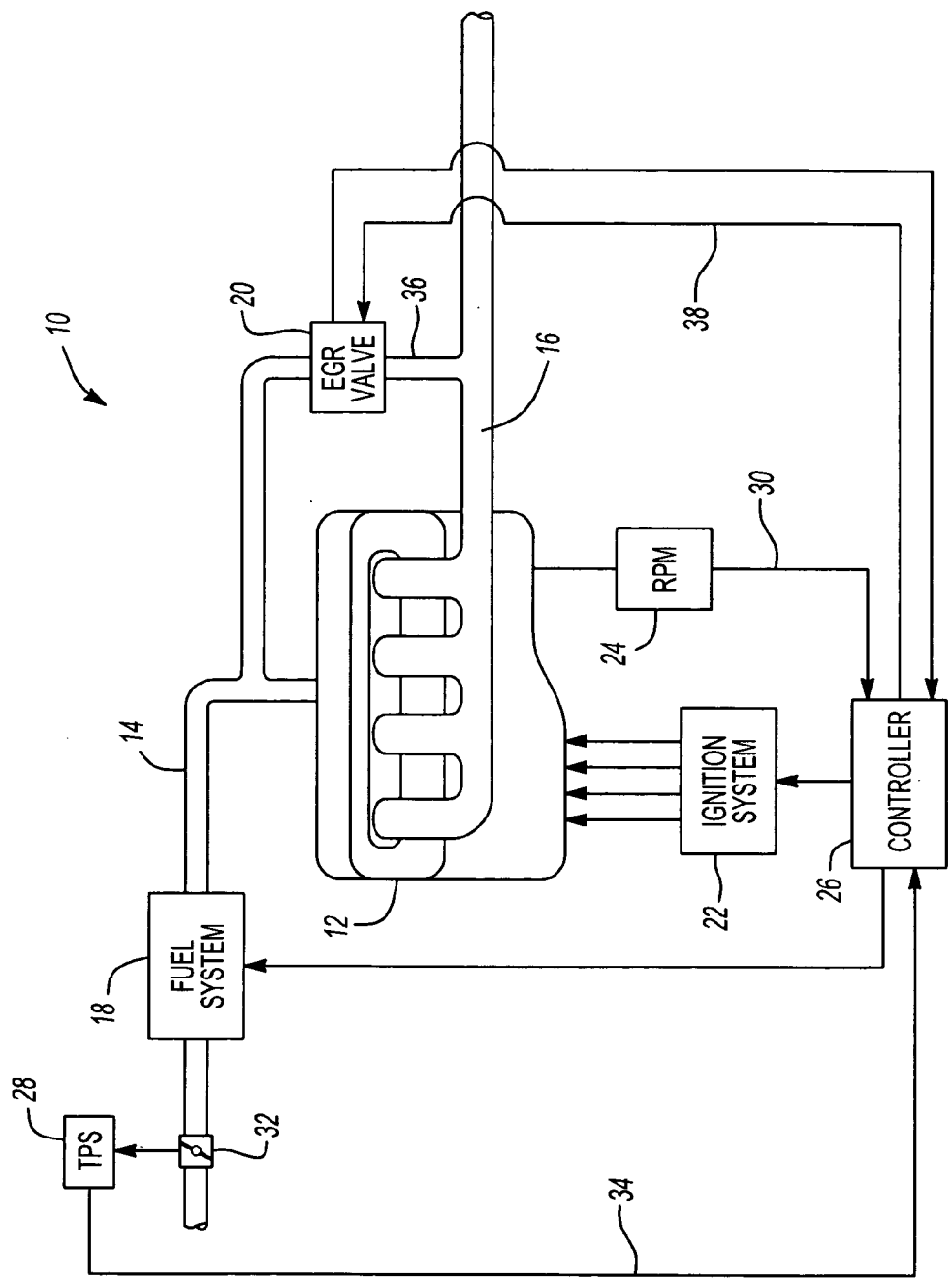
FIG. 1 is a functional block diagram of an exhaust gas recirculation control system including an exhaust gas recirculation valve according to the present invention.

Referring to FIG. 1, an engine control system 10 includes an engine 12, an intake manifold 14, an exhaust manifold 16, a fuel system 18, an EGR valve 20, an ignition system 22, an engine speed sensor 24, an engine controller 26, and a throttle position sensor (TPS) 28. The engine speed sensor 24 determines a speed of the engine 12 and generates an engine speed signal 30. The TPS 28 communicates with the throttle 32 and generates a throttle position signal 34. The engine controller 26 monitors and adjusts engine performance based on various input signals. For example, the controller 26 receives the engine speed signal 30 from the engine speed sensor 24 and the throttle position signal 34 from the TPS 28. The controller 26 calculates air flow into the engine 12 and fuel delivery from a fuel system 18 to the engine 12 based on variables such as engine speed and manifold absolute pressure. The controller 26 communicates with the ignition system 22 to determine ignition spark timing.

The controller 26 adjusts the EGR valve 20 to reduce certain emissions. Higher combustion temperatures in the engine 12 increase levels of the emissions in exhaust gas. Directing a portion of the exhaust gas back into the engine 12 along with intake air reduces the combustion temperatures. The EGR valve 20 controls the amount of exhaust gas that is recirculated with the intake air. The recirculated exhaust gases lower the combustion temperatures, which reduces emissions. The controller 26 determines the position of the EGR valve 20 based on engine conditions such as engine speed and desired air per cylinder. A conduit 36 connects the exhaust manifold 16 to the intake manifold 14. The EGR valve 20 is positioned along the conduit 36 and meters EGR according to input from the controller 26.

The EGR valve 20 is operable to actuate between a fully open and fully closed position. The controller 26 controls the position of the EGR valve 20 with an EGR valve voltage signal 38. For example, the EGR valve 20 includes a linear solenoid actuator that is responsive to the EGR valve voltage signal 38. In other words, the controller 26 regulates current through the solenoid in order to open and close the EGR valve 20. The controller 26 generates the EGR valve voltage signal 38 according to inputs from the system 10. In the preferred embodiment, the controller 26 calculates a desired flow rate of exhaust gas through the EGR valve 20 according to one or more inputs, including, but not limited to, engine speed, throttle position, mass air flow, ambient temperature, and vehicle speed. The controller 26 calculates a desired EGR valve position according to the desired flow rate. The controller 26 controls the EGR valve position according to the desired EGR valve position as described below.

Figure 2:
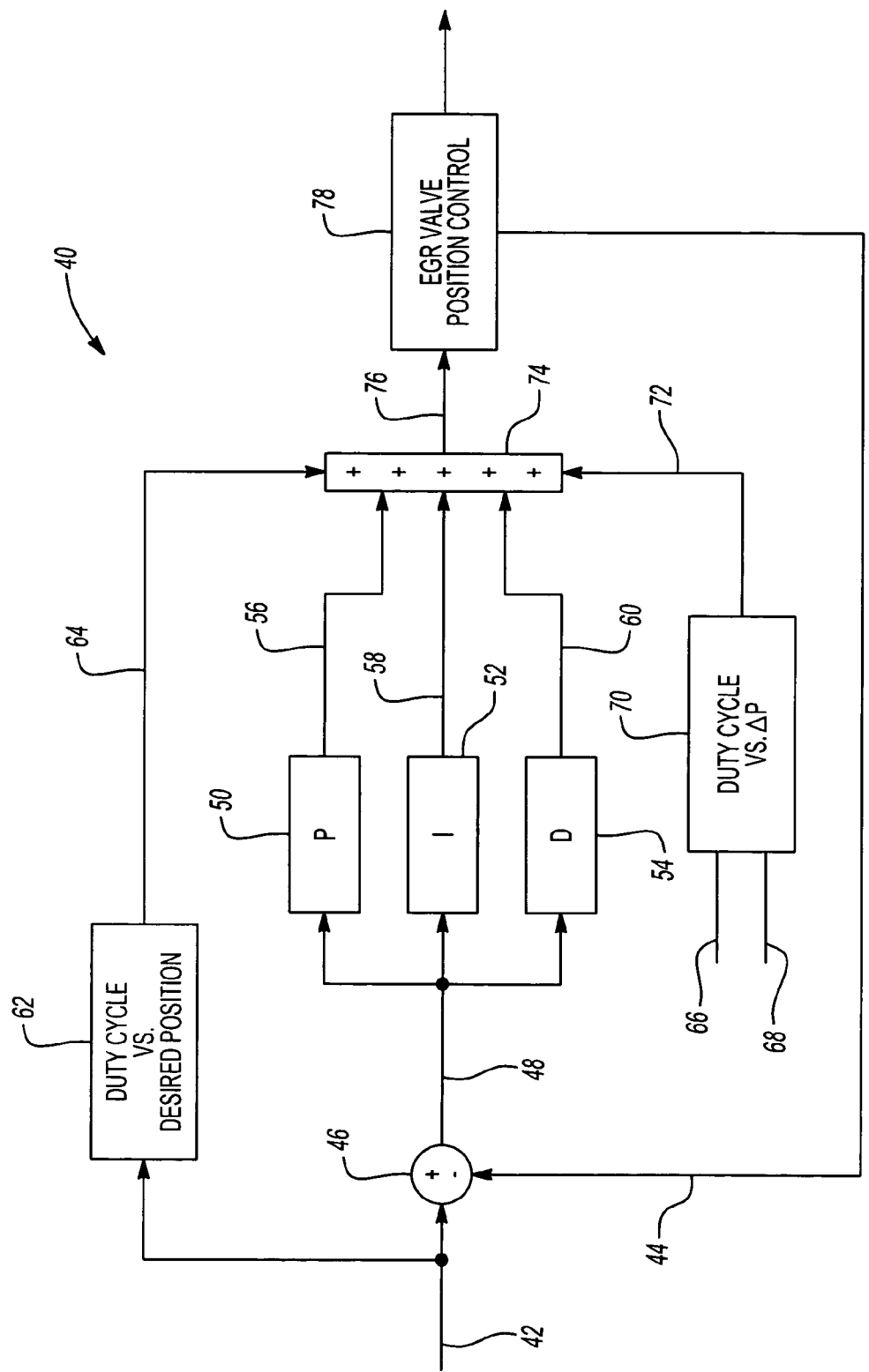
FIG. 2 is a schematic diagram of an EGR valve position control scheme according to the present invention.

The controller utilizes a control scheme 40 to continually adjust the EGR valve position as shown in FIG. 2. The control scheme 40 receives a desired EGR valve position 42 and an actual EGR valve position 44 at node 46. The control scheme 40 calculates a EGR valve position error 48 at node 46 based on the desired EGR valve position 42 and the actual EGR valve position 44. In the preferred embodiment, the control scheme 40 performs PID control operations on the EGR valve position error 48. For example, the control scheme 40 performs proportional, integral, and derivative operations 50, 52, and 54 on the EGR valve position error 48. The outputs 56, 58, and 60 of the derivative operations 50, 52, and 54, respectively, are duty cycle control terms.

Additionally, the control scheme 40 includes one or more feedforward terms. The control scheme determines a duty cycle control term as a function of the desired EGR valve position 42 according to a lookup table, which is represented schematically at 62. The control scheme 40 uses the lookup table 62 to select and output a duty cycle control term 64 based on the desired EGR valve position 42. The lookup table 62 is populated with calibratable duty cycle control terms associated with the desired EGR valve position 42 according to one or more observed conditions. For example, the duty cycle control term 64 may be selected to correspond to a particular EGR valve position based on observable dynamometer data.

The control scheme 40 determines an additional feedforward term according to a change in pressure across the EGR valve. The control scheme 40 determines a duty cycle control term as a function of intake manifold pressure 66 and upstream exhaust pressure 68 at a lookup table, which is represented schematically at 70. In the preferred embodiment, the intake manifold pressure 66 is physically measured, while the upstream exhaust pressure 68 is modeled based on one or more engine conditions, such as mass air flow. The difference between the intake manifold pressure 66 and the upstream exhaust pressure 68 is indicative of the change in pressure ΔP across the EGR valve. The control scheme 40 uses the lookup table 70 to select and output a duty cycle control term 72 based on the change in pressure across the EGR valve. The lookup table 70 is populated with calibratable duty cycle control terms associated with the change in pressure across the EGR valve according to one or more observed conditions.

The control scheme 40 performs a summing operation, which is represented schematically at 74. The control scheme 40 sums the duty cycle control terms 56, 58, 60, 64, and 72, and outputs a final EGR valve duty cycle control term 76. The output process of the control scheme 40 is the solenoid actuator of the EGR valve, represented schematically at 78. The actuator 78 opens and closes the EGR valve according to the EGR valve duty cycle control term 76. Additionally, the actuator 78 includes a feedback sensor. The feedback sensor generates a feedback signal that is indicative of the position of the EGR valve. The feedback signal is represented schematically as the actual EGR valve position 44. In this manner, the control scheme 40 determines the position of the EGR valve based on PID control of the desired and actual EGR valve positions 42 and 44, including feedforward control 62 based on the desired EGR valve position and feedforward control 70 based on change in pressure across the EGR valve.

Figure 3:
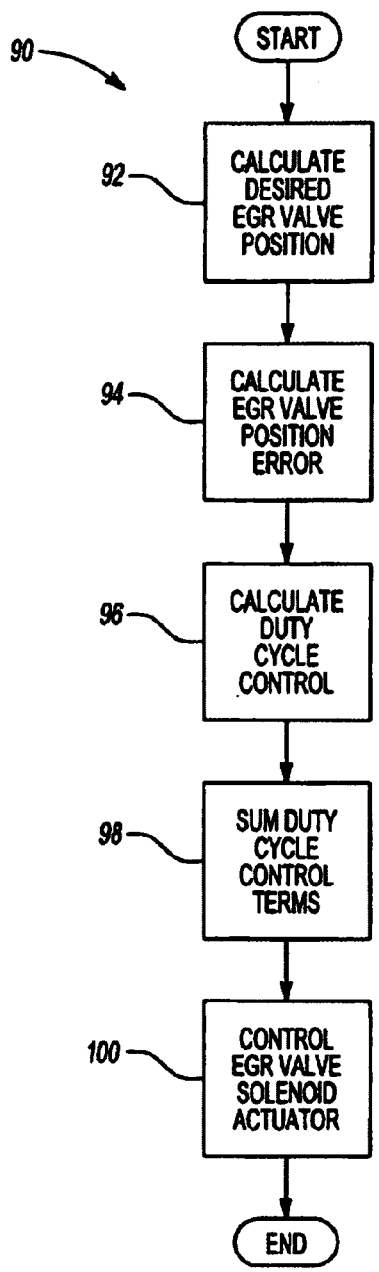
FIG. 3 is a flow diagram of the EGR valve position control scheme according to the present invention.

An EGR valve control algorithm 90 is shown in FIG. 3. At step 92, the algorithm 90 calculates a desired EGR valve position. The algorithm 90 calculates the desired EGR valve position according to one or more system variables, including, but not limited to, a desired EGR valve flow rate. At step 94, the algorithm 90 calculates an EGR valve position error. The algorithm 90 calculates the EGR valve position error according to the desired EGR valve position and an actual EGR valve position. At step 96, the algorithm 90 calculates one or more duty cycle control terms for controlling a solenoid actuator of the EGR valve. For example, the algorithm 90 performs PID control on the EGR valve position error in order to generate duty cycle control terms indicative of the proportional, integral, and derivate control. Additionally, the algorithm 90 calculates one or more feedforward duty cycle control terms. The feedforward duty cycle control terms include a duty cycle control term indicative of the desired EGR valve position and a duty cycle control term indicative of a change of pressure across the EGR valve. At step 98, the algorithm 90 determines an output duty cycle control term based on the PID control duty cycle control terms and the one or more feedforward duty cycle control terms. For example the algorithm sums the duty cycle control terms calculated at step 96. At step 100, the algorithm control the duty cycle of the solenoid actuator according to the output duty cycle control term.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A position control system for an EGR valve that includes a solenoid actuator, the position control system comprising:
    a desired EGR valve position module that calculates a desired EGR valve position;
    an actual EGR valve position module that communicates with the EGR valve and calculates an actual EGR valve position;
    an EGR valve pressure change module that determines a pressure change across the EGR valve;
    a first lookup table that communicates with the EGR valve position module and determines a first duty cycle control term indicative of the desired EGR valve position;
    a second lookup table that communicates with the EGR valve pressure change module and determines a second duty cycle control term indicative of the pressure change; and
    a control module that communicates with the desired EGR valve position module, the actual EGR valve position module, and the first and second lookup tables, wherein the control module generates an error signal based on the desired EGR valve position and the actual EGR valve position, calculates at least one third duty cycle control term based on the error signal, and controls a duty cycle of the solenoid actuator according to the first, second, and third duty cycle control terms.

2. The position control system of claim 1 wherein the desired EGR valve position module calculates the desired EGR valve position based on a desired EGR flow rate.

3. The position control system of claim 1 wherein the EGR valve pressure change module determines the pressure change according to an intake manifold pressure and an upstream exhaust pressure.

4. The position control system of claim 1 wherein the control module calculates a sum of the first, second, and at least one third duty cycle control terms and controls the duty cycle according to the sum.

5. An position control method for an EGR valve, the method comprising:
- calculating a desired EGR valve position;
- calculating an EGR valve position error according to the desired EGR valve position and an actual EGR valve position;
- calculating at least one duty cycle control term based on the EGR valve position error;
- calculating at least one duty cycle feedforward term;
- calculating an output duty cycle based on the at least one duty cycle feedforward term and the at least one duty cycle control term; and
- controlling a duty cycle of a solenoid actuator based on the output duty cycle.

6. The method of claim 5 wherein the step of calculating the desired EGR valve position includes calculating the desired EGR valve position based on a desired EGR valve flow rate.

7. The method of claim 5 wherein the step of calculating an EGR valve position error includes calculating the EGR valve position error based on a difference between the desired and actual EGR valve positions.

8. The method of claim 5 wherein the step of calculating the at least one duty cycle control term includes performing PID control on the EGR valve position error.

9. The method of claim 5 wherein the step of calculating the at least one duty cycle feedforward term includes using a lookup table to select a duty cycle feedforward term that corresponds to the desired EGR valve position.

10. The method of claim 5 wherein the step of calculating the output duty cycle includes summing the at least one duty cycle feedforward term and the at least one duty cycle control term.

11. The method of claim 5 wherein the step of calculating the at least one duty cycle feedforward term includes using a lookup table to select a duty cycle feedforward term that corresponds to a pressure change across the EGR valve.

12. The method of claim 11 further comprising the step of calculating the pressure change across the EGR valve according to an intake manifold pressure and an upstream exhaust pressure.

* * * * *